(12) United States Patent
Skog

(10) Patent No.: US 6,427,076 B2
(45) Date of Patent: Jul. 30, 2002

(54) METHOD AND SYSTEM FOR MANIPULATING SUBSCRIBER DATA

(75) Inventor: Robert Bengt Skog, Sollentuna (SE)

(73) Assignee: Telefonaktiebolaget LM Ericsson (Publ) (SE)

(*) Notice: Subject to any disclaimer, the term of this patent is extended or adjusted under 35 U.S.C. 154(b) by 0 days.

(21) Appl. No.: 09/163,949

(22) Filed: Sep. 30, 1998

(51) Int. Cl.$^7$ ................................................ H04Q 7/20
(52) U.S. Cl. .................. 455/433; 455/432; 455/436; 455/437; 455/439
(58) Field of Search ............................... 455/422, 432, 455/433, 434, 435, 436, 437, 439, 440, 442, 445, 560

(56) References Cited

U.S. PATENT DOCUMENTS

| | | | |
|---|---|---|---|
| 5,524,135 A | 6/1996 | Mizikovsky et al. | 379/58 |
| 5,590,175 A | * 12/1996 | Gallant et al. | 379/58 |
| 5,689,825 A | 11/1997 | Averbuch et al. | 455/89 |
| 5,754,953 A | 5/1998 | Briancon et al. | 455/418 |
| 5,819,178 A | * 10/1998 | Cropper | 455/433 |
| 5,887,253 A | * 3/1999 | O'Neil et al. | 455/418 |
| 5,896,376 A | * 4/1999 | Alperovich et al. | 370/348 |
| 5,896,566 A | 4/1999 | Averbuch et al. | 455/419 |
| 5,915,225 A | * 6/1999 | Mills | 455/558 |
| 5,924,035 A | * 7/1999 | Joensuu | 455/445 |
| 5,930,699 A | * 7/1999 | Bhatia | 455/414 |
| 5,930,701 A | * 7/1999 | Skog | 455/415 |
| 5,983,090 A | * 11/1999 | Aoki | 455/403 |
| 5,999,825 A | * 12/1999 | Geulen | 455/560 |
| 6,014,561 A | * 1/2000 | Molne | 455/419 |
| 6,018,654 A | * 1/2000 | Valentine et al. | 455/414 |
| 6,023,618 A | * 2/2000 | Janhonen et al. | 455/406 |

(List continued on next page.)

FOREIGN PATENT DOCUMENTS

| | | |
|---|---|---|
| EP | RS 101878 | 6/1999 |
| WO | WO 97/16938 | * 10/1996 |
| WO | WO 98/30056 | 7/1998 |
| WO | WO 98/31169 | 7/1998 |

OTHER PUBLICATIONS

Digital Cellular Telecommunications System(Phase 2); Unstructured Supplementary Service Data (USSD)—Stage 1 (GSM 02.90 Version 4.1.0) European Telecommunication Standard, pr ETS 300 625, Apr. 1997, Second Edition, RE/SMG–010290PR, pp. 1–11.

Digital Cellular Telecommunications System; Unstructured Supplementary Service Data (USSD)—Stage 2 (GSM 03.90 Version 5.0.0) GSM Technical Specification, Dec. 1996, TS/SMG–030390Q, pp. 1–35.

Primary Examiner—William Trost
Assistant Examiner—Congvan Tran
(74) Attorney, Agent, or Firm—Jenkens & Gilchrist, A Professional Corporation

(57) ABSTRACT

A method and system in a wireless network system enables at least a portion of a subscriber data record to be accessed and used within an MS. The subscriber data record, which can be stored in an HLR, is divided into a portion related to the wireless network (e.g., for use by an MSC/VLR) and a portion related to the MS. A flag is associated with the portion related to the MS. When the flag is set, the HLR knows that the portion has been altered since the last time it was sent to the MS. Consequently, when a location update is occurring, for example, the HLR sends to the MSC/VLR via a MAP operation both portions when the flag is set. The receiving MSC/VLR forwards the portion related to the MS to the MS using a protocol such as the USSD. The MS includes an application for storing and subsequently accessing the MS-related portion of the subscriber data record. The wireless network can thus control subscriber data in the MS.

40 Claims, 4 Drawing Sheets

U.S. PATENT DOCUMENTS

| | | | |
|---|---|---|---|
| 6,091,952 A | * | 7/2000 | Xu et al. ..................... 455/433 |
| 6,097,942 A | * | 7/2000 | Laiho ......................... 455/414 |
| 6,115,600 A | * | 9/2000 | Tuohino et al. ............. 455/405 |
| 6,148,200 A | * | 11/2000 | Lahtinen ..................... 455/433 |
| 6,167,264 A | * | 12/2000 | Palvianen et al. .......... 455/433 |
| 6,181,939 B1 | * | 1/2001 | Ahvenainen ................ 455/433 |
| 6,223,035 B1 | * | 4/2001 | Pierce et al. ................ 455/433 |
| 6,269,244 B1 | * | 7/2001 | Alperovich et al. ........ 455/433 |
| 6,308,069 B1 | * | 10/2001 | Freitag et al. .............. 455/435 |
| 6,324,399 B1 | * | 11/2001 | Salmivalli ................... 455/433 |

* cited by examiner

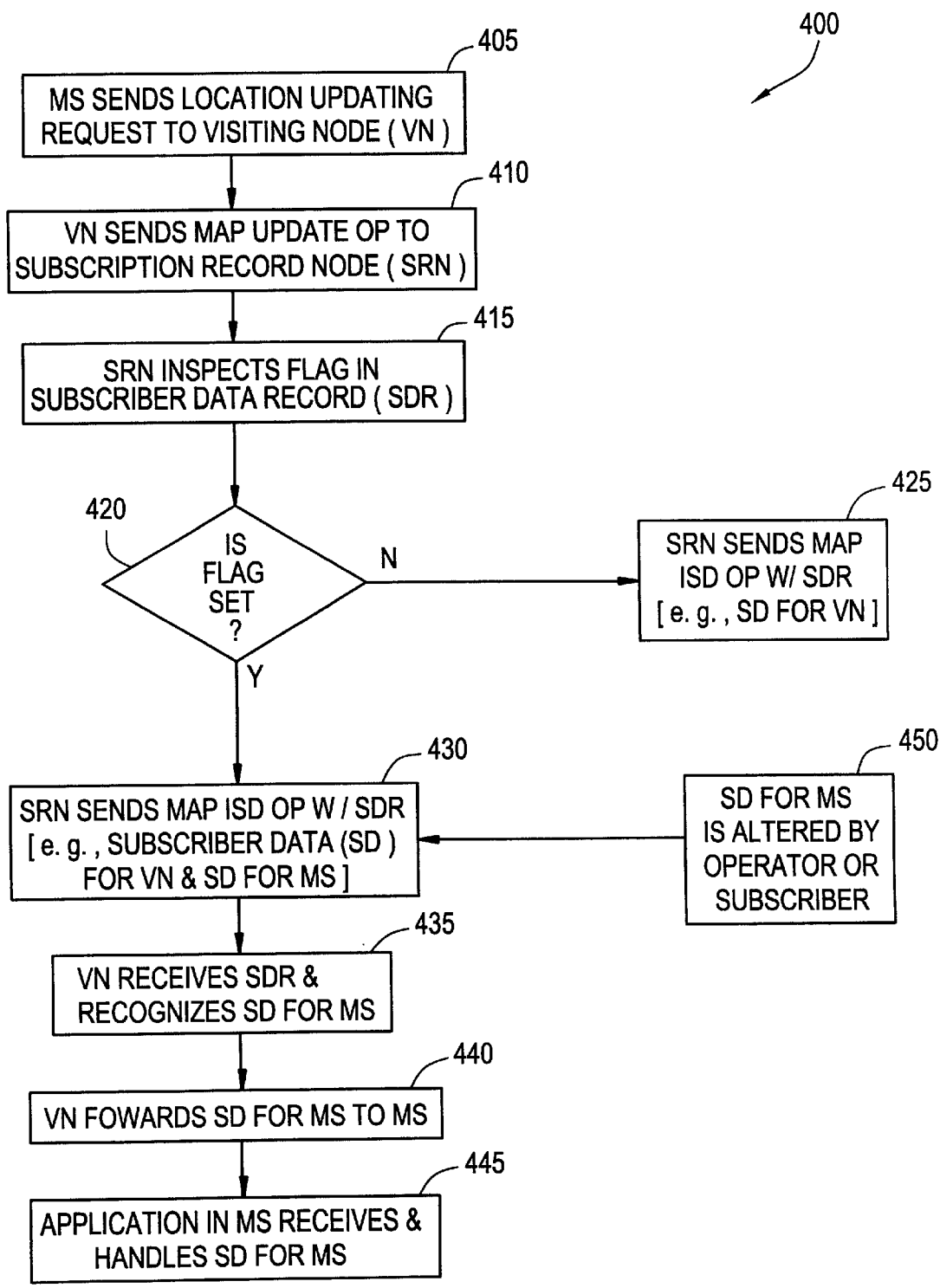

METHOD AND SYSTEM FOR MANIPULATING SUBSCRIBER DATA

BACKGROUND OF THE INVENTION

1. Technical Field of the Invention

The present invention relates in general to the field of communications, and in particular, to enabling subscriber data to be transmitted to and used by a mobile station (MS) in a wireless communications system.

2. Description of Related Art

Mobile wireless communication is becoming increasingly important for safety, convenience, and efficiency. MSs, for example, can be found in cars, briefcases, purses, and even pockets. These MSs are capable of providing both voice connections and data connections. The data connections may, for example, be used as a conduit for forwarding information packets from the wireless network system to a private network such as the Internet.

While both wireless communication and Internet access have been proliferating individually, the two technologies have been converging as well. As noted above, many subscribers to wireless networks now access the Internet via their MS (e.g., cell phone, computer with a wireless link, etc.). Wireless subscribers are thus able to send/receive data packets to/from the Internet as well as engage in voice conversations over a wireless or wireline network.

To access a specific content server on the Internet from an MS, a subscriber typically supplies an Internet Protocol (IP) address and a password in order to be granted access to the content server (assuming, for example, a Global System for Mobile Communications (GSM) data connection to the Internet). These Internet content services may be based on a content service subscription, and information such as IP addresses and passwords can be termed subscription parameters. It would be beneficial for such subscription parameters to be handled in a manner convenient to operators of wireless networks.

Conventional wireless network systems include a subscriber data record (SDR) that the wireless network uses to provide services to a subscriber using an MS. The MS is not, however, provided access to information in the SDR. The MS is provided access, on the other hand, to information in a Subscriber Identity Module (SIM), but it is not feasible for operators to put subscription parameters in the SIM card when a GSM (for example) subscription is ordered because the information contained in the subscription parameters is likely to need to be changed in response to subscriber or operator demands. It would be advantageous to wireless network operators if Internet subscription parameters, for example, could be manipulated by wireless network systems in a convenient manner.

SUMMARY OF THE INVENTION

The deficiencies of the prior art are overcome by the method and system of the present invention. For example, as heretofore unrecognized, it would be beneficial if SDRs contained information for delivery to and use by the MS. In fact, it would be beneficial if such information were forwarded by the wireless network to the MS and appropriately utilized therein.

An exemplary wireless network system according to the present invention includes a wireless network and at least one MS. The exemplary wireless network includes a subscription record node (SRN) (such as a Home Location Register (HLR)) and a visiting node (VN) (such as a Mobile Services Switching Center (MSC) node, a Visiting Location Register (VLR) node, or a combined MSC/VLR node). The SRN maintains an SDR for a subscriber. When an MS (i) moves from a first area of a first VN to a second area of a second VN, (ii) is first turned on, or (iii) is otherwise in need of updating, the SDR is transferred appropriately according to the present invention. By properly manipulating the SDR, Internet subscription parameters (for example) are accommodated by the wireless network system in a manner convenient to operators.

In one aspect of the present invention, the SDR of the SRN is bifurcated into a portion related (primarily) to the wireless network (e.g., the VNs) and a portion related (primarily) to the MS. The portion related to the MS may include, for example, Internet subscription parameters. In another aspect of the present invention, when an MS of a subscriber moves into an area of a new VN, the SRN provides the SDR, including both portions, to the new VN. The new VN may then forward the portion related to the MS to the MS. In yet another aspect of the present invention, the MS receives the portion of the SDR that relates to the MS and is able, using a software application for example, to store and utilize the associated information. The information may be utilized, for example, when accessing the Internet with the Internet subscription parameters.

An important technical advantage of the present invention is that it enables SDRs to be manipulated in various manners for various purposes.

Another important technical advantage of the present invention is that it provides SDRs that are bifurcated into portions related primarily to the wireless network and portions related primarily to the MS.

Yet another important technical advantage of the present invention is the ability to provide at least a portion of the SDR to the MS.

Yet another important technical advantage of the present invention is the ability of the MS to receive, to analyze, and to possibly alter/respond to information in the SDR, such as Internet subscription parameters.

The above-described and other features of the present invention are explained in detail hereinafter with reference to the illustrative examples shown in the accompanying drawings. Those skilled in the art will appreciate that the described embodiments are provided for purposes of illustration and understanding and that numerous equivalent embodiments are contemplated herein.

BRIEF DESCRIPTION OF THE DRAWINGS

A more complete understanding of the method and system of the present invention may be had by reference to the following detailed description when taken in conjunction with the accompanying drawings wherein:

FIG. 4 illustrates a method in flowchart form in accordance with the present invention.

DETAILED DESCRIPTION OF THE DRAWINGS

Preferred embodiments of the present invention and its advantages are best understood by referring to FIGS. 1–4 of the drawings, like numerals being used for like and corresponding parts of the various drawings.

Aspects of the GSM standard will be used to describe various aspects of the present invention. However, it should be understood that the principles of the present invention are applicable to other wireless communication standards (or systems), especially those in which at least part of subscriber data is stored in one or more nodes of a system and services relating thereto can be advantageously implemented in an MS. Such services may be, depending on the type of service, implemented in either the wireless network (e.g., in a Signaling Control Point (SCP) or an MSC), in the MS, or in some combination thereof. The information in the SDR enables the services to function and/or be provided.

Figure 1:
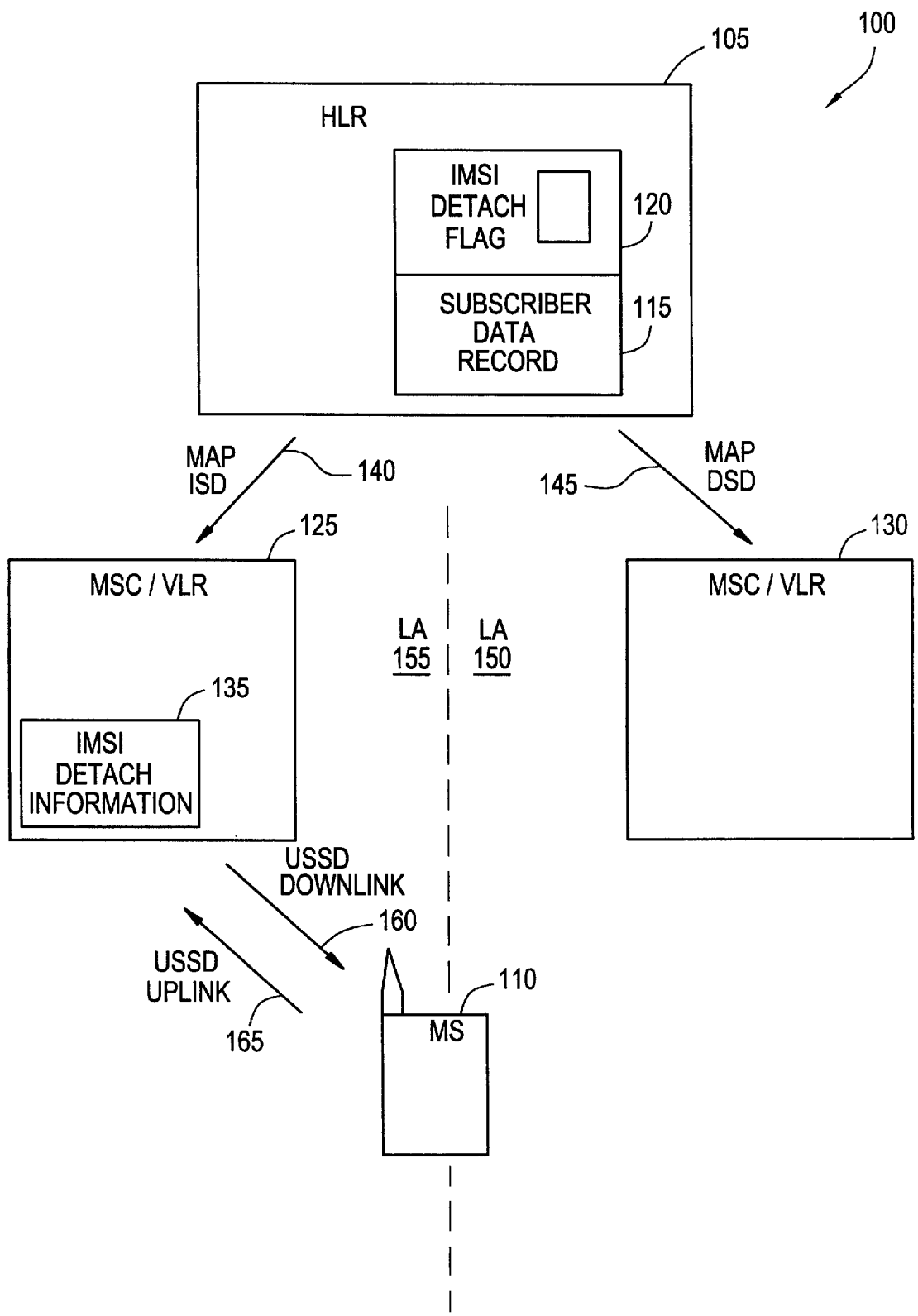
FIG. 1 illustrates a block diagram of an exemplary wireless network system in accordance with the present invention.

Referring now to FIG. 1, a block diagram of an exemplary wireless network system in accordance with the present invention is illustrated generally at 100. The exemplary wireless network system 100 includes an SRN (e.g., an HLR) 105 and an MS 110. The HLR 105 maintains a SDR 115 and an International Mobile Station Identity (IMSI) detach flag 120 in local memory. The SDR 115 includes various information pertaining to the subscriber such as directory number, category, subscription information, etc. The exemplary wireless network system 100 also includes two VNs (such as MSC nodes, VLR nodes, or combined MSC/VLR nodes) 125 and 130. Without limitation, the two VNs may be referred to as the MSC/VLR 125 and the MSC/VLR 130.

The mobile subscriber associated with the MS 110 may roam freely within the wireless network while the network nevertheless continually knows where the MS 110 is located. Consequently, the MS 110 may receive a call regardless of its location. To keep the wireless network (essentially) constantly informed of the location of the subscriber and the MS 110, the MS 110 informs the wireless network whenever it changes location area (LA), e.g., from the LA 150 associated with the MSC/VLR 130 to the LA 155 associated with the MSC/VLR 125. This process is termed location updating. Two types of location updating are (i) normal and (ii) attach (periodic registration may cause an MS to be marked as detached). The MS 110 will additionally inform the wireless network when it enters an inactive state.

The normal location updating occurs when the MS 110 moves to a new location, e.g., from the LA 150 associated with the MSC/VLR 130 to the LA 155 associated with the MSC/VLR 125. When this occurs, the SDR 115 is sent by the HLR 105 to the MSC/VLR of the new location, e.g., the MSC/VLR 125. The IMSI-attach-type location updating occurs after the MS 110 has entered the active state. Prior to having entered the active state, the MS 110 may have performed an IMSI detach to have entered the inactive state.

An IMSI detach is performed when the subscriber turns off the MS 110 or takes out the SIM. During the IMSI detach, the MS 110 informs the wireless network that the MS 110 is about to enter an inactive state. The IMSI detach information 135 may be stored in the VLR 125 with no information being passed to the HLR 105. Alternatively, the HLR 105 may be informed about the IMSI detach operation, and the IMSI detach flag 120 is set in the HLR 105. As discussed above, when exiting the IMSI detach (e.g., the inactive) state and entering the active state, the MS 110 performs an IMSI attach-type location updating. If the IMSI detach flag 120 is set within the HLR 105, (re-)entering the active state causes a normal location updating from the MS 110 in which the SDR 115 is transmitted to the relevant VN.

The SDR 115 may be sent from the HLR 105 to the MSC/VLR 125 using a Signaling System No. 7 (SS7) Mobile Application Part (MAP) operation. For example, a MAP Insert Subscriber Data (ISD) operation 140 may be used. By invoking the MAP ISD operation, the SDR 115 (or a portion thereof) is sent to the destination VLR. The MAP ISD operation can be invoked as a consequence of, for example, (i) updating location or restoring data and (ii) an alteration or addition of the subscriber data that should be reported to an MSC/VLR associated with the LA in which the MS 110 is located. If the entire subscriber data that the HLR 105 is sending fails to fit within a single Invoke component, then multiple Invoke components may be sent. When the MS 110 is leaving the LA 150 of the MSC/VLR 130, on the other hand, a MAP Delete Subscriber Data (DSD) operation 145 may be used to inform the MSC/VLR 130 about withdrawing the subscriber data.

While the MAP protocol may be used for communication between the HLR 105 and the MSC/VLR 125 and 130, the Unstructured Supplementary Service Data (USSD) provisions of the GSM standard may be used to send text to the MS 110. Descriptions of the USSD provisions may be found in, for example, the ETSI/GSM-TS (e.g., GSM 02.90 (Stage 1) and GSM 03.90 (Stage 2)). The GSM standard incorporates a wide range of supplementary services (e.g., Call Barring, Call Forwarding, etc.). These services may be managed (e.g., activated, canceled, options thereof established or changed, etc.) by entering text strings that are sent to the wireless network from the MS 110. For example, entering and sending the text string "**21*1234567#SEND" will divert all incoming calls to the number "123-4567". Typically, most cellular phone manufacturers provide more user-friendly methods (e.g., menu-prompted options) to manage the various services.

In most situations, when standard GSM supplementary services are managed from the MS, structured and functional signaling is available. If the subscriber activates the supplementary service Call Forwarding, for example, the MS recognizes this request and invokes a standard signaling procedure towards the wireless network. Activating Call Forwarding in this manner is successful because the Call Forwarding supplementary service is part of the GSM standard that is implemented.

Because the supplementary services were introduced into GSM-based systems in stages, a risk existed that a subscriber might try to manage (e.g., activate) a supplementary service that was not yet implemented. To account for this possibility, the container mechanism USSD was included in the GSM standard. USSD operations may be used towards the wireless network when an MS does not recognize the text string entered by the subscriber. The USSD Phase 2 protocol, furthermore, permits the wireless network to send USSD operations towards the MS, as well as combining MS-initiated and wireless-network-initiated operations in order to exchange data in a dialogue manner. Because the content of the USSD operations sent from the wireless network to the MS may be displayed at the MS, and the content of the operations sent from the MS to the wireless network can be routed to an operator-provided application in the wireless network, the USSD is used in the present invention as a transparent pipe through a GSM-based network.

With continuing reference to FIG. 1, the wireless network (e.g., the HLR 105, the MSC/VLR 125, and the MSC/VLR 130) may at any time send a USSD operation towards the MS 110, such as an exemplary USSD downlink operation 160. As a general alternative for the information transfer, data may be pushed towards the MS 110 using any network-supported operation/protocol (e.g., a GSM MAP USSD operation). This USSD downlink operation 160 may be either a request (e.g., asking the MS 110 to provide information) or a notification (e.g., requiring no information in response from the MS 110). When a response is necessary, the MS 110 may send an exemplary USSD uplink operation 165 to the wireless network. It should be noted that a subscriber need not make any prior provision (e.g., contract agreement) to utilize USSD operations because to the extent USSD operations are available, both the network and the MS already implement and/or support the required protocols. Prior provisions for services that utilize USSD, however, may be arranged in some circumstances. In other words, a user typically subscribes with an operator for service(s) that utilize USSD operations as a "carrier." An example of such a service is Unified Messaging application(s). Consequently, indicia of whether a subscriber may utilize USSD operations is not normally required in the SDR 115. The USSD operations (including requests, notifications, and responses, but not necessarily responses to notifications) may contain the USSD string, an alphabet indicator, and a language indicator.

Figure 2:
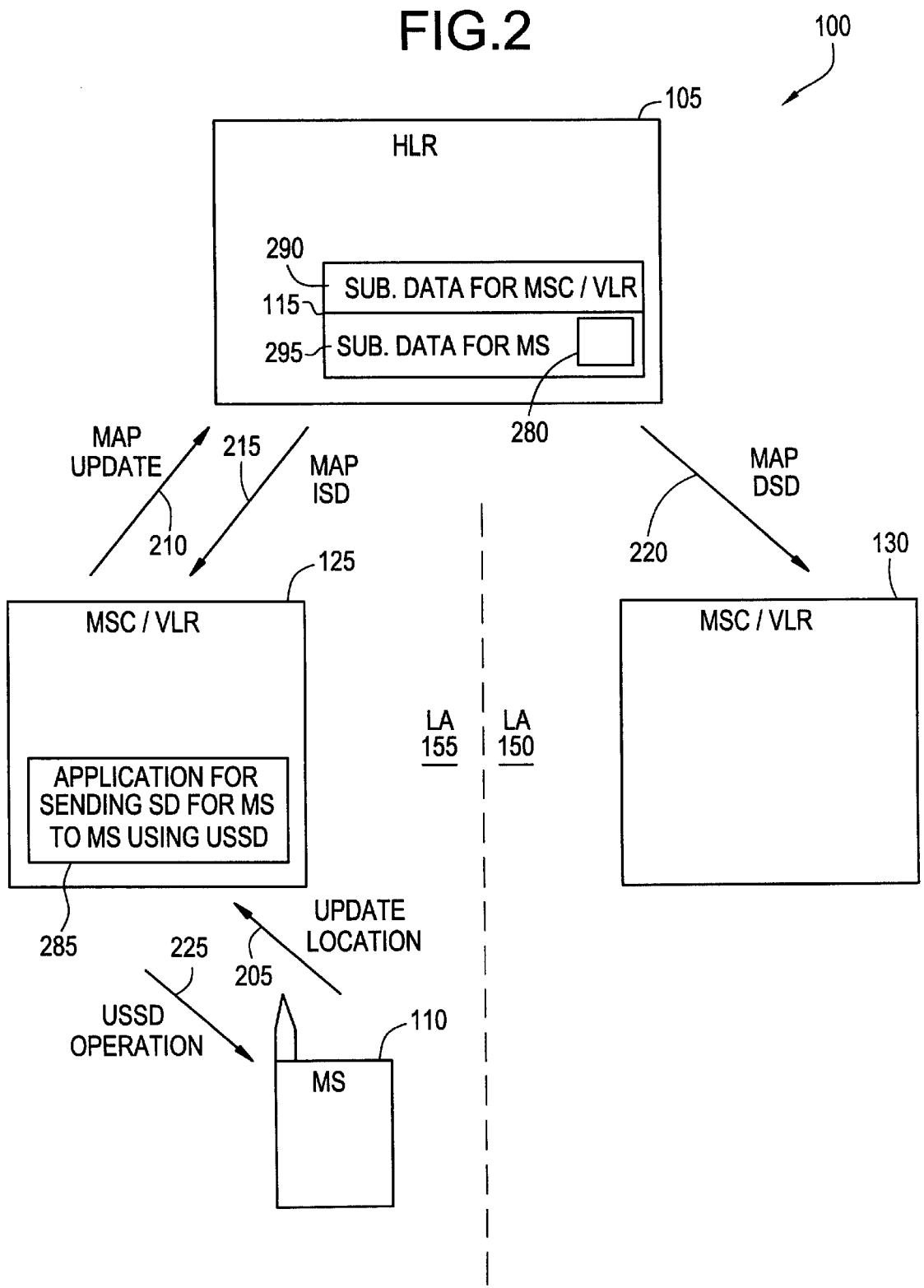
FIG. 2 illustrates a block diagram of an exemplary wireless network system in accordance with certain aspects of the present invention.

With reference now to FIG. 2, a block diagram of an exemplary wireless network system in accordance with certain aspects of the present invention is illustrated. In accordance with the present invention, the MAP protocol and the USSD provisions are used (in conjunction with other principles) to transfer at least part of a SDR, such as Internet subscription parameters, to an MS for processing and use therein. Advantageously, the MS may be updated with changes to the SDR as necessary.

As shown within the HLR 105, the SDR 115 is divided into two portions. First, a subscriber data for MSC/VLR 290 portion is related to services in the multiple MSC/VLRs (e.g., MSC/VLR 125 and 130) of the wireless network system 100. Second, a subscriber data for MS 295 portion is related to services in the MS 110, also of the wireless network system 100. Also included in the HLR 105 is a flag 280 that is associated with the subscriber data for MS 295. The flag 280 indicates whether the specific data currently in the subscriber data for MS 295 has already been delivered to the MS. In other words, and by way of example, the flag 280 is set if the subscriber data for MS 295 has been altered (e.g., by changes, additions, deletions, etc. thereto) since the subscriber data for MS 295 was most-recently transmitted to the MS 110.

Continuing with FIG. 2, the MS 110 has moved completely within the LA 155 of the MSC/VLR 125 from the LA 150 of the MSC/VLR 130. As a result, the MS 110 sends an update location operation 205 to the MSC/VLR 125. The MSC/VLR 125 sends a MAP UPDATE operation 210 to the HLR 105 with the new location (e.g., the LA 155). The HLR 105 responds by sending at least part of the SDR 115 in a MAP ISD operation 215 to the (new) MSC/VLR 125. Preferably, the HLR 105 sends at least the subscriber data for MSC/VLR 290. The HLR 105 may also automatically send the subscriber data for MS 295 if no flag 280 is included. The HLR 105, preferably however, inspects the flag 280 associated with the subscriber data for MS 295. If the flag 280 is set, then the HLR 105 sends at least a portion of the subscriber data for MS 295 to the MSC/VLR 125 in the MAP ISD operation 215. The flag 280 may, for example, be only a single flag in which case all of the subscriber data for MS 295 is sent when the flag 280 is set. Alternatively, the flag 280 may be composed of multiple flags 280 that correspond to individual sections of the subscriber data for MS 295 (or, e.g., a single or multiple pointer flag(s) 280 that point(s) to a particular section(s) of the subscriber data for MS 295). In this case, the HLR 105 sends each section of the subscriber data for MS 295 for which the corresponding flag 280 is set (or, e.g., for which a given pointer flag 280 points).

The HLR 105 also sends a MAP DSD operation 220 to the (old) MSC/VLR 130 to remove the SDR 115 (or, more specifically, the subscriber data for MSC/VLR 290) that may be stored within the (old) MSC/VLR 130 VN. After the MSC/VLR 125 receives the MAP ISD operation 215 from the HLR 105, the MSC/VLR 125 performs several functions. In a conventional manner, the MSC/VLR 125 records the subscriber data for MSC/VLR 290 portion of the SDR 115. Furthermore, the MSC/VLR 125 additionally utilizes a software (or, e.g., a firmware, hardware, or some combination thereof) application 285 for sending the subscriber data for MS 295 to the MS 110 using the USSD provisions. The software application 285 inspects the received SDR 115 to determine whether any subscriber data for MS 295 has been received. When the MSC/VLR 125 recognizes/determines that some subscriber data for MS 295 has been sent by the HLR 105, the MSC/VLR 125 realizes that the subscriber data for MS 295 is destined for the MS 110. Consequently, the MSC/VLR 125 initiates a USSD operation 225, which includes the subscriber data for MS 295, towards the MS 110.

Figure 3:
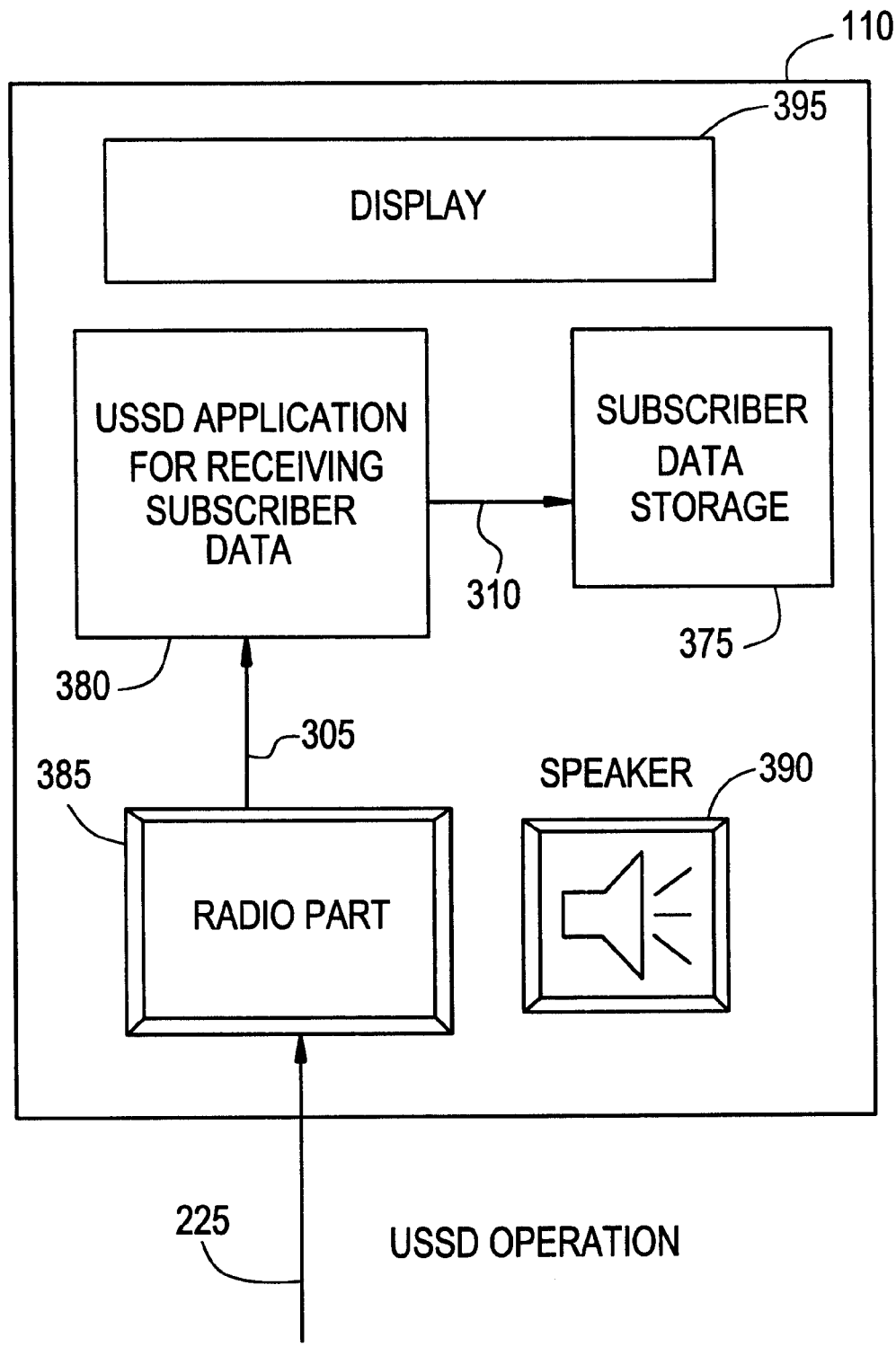
FIG. 3 illustrates a block diagram of an exemplary mobile station in accordance with additional aspects of the present invention.

With reference now to FIG. 3, a block diagram of an exemplary MS in accordance with additional aspects of the present invention is illustrated. The MS 110 includes a display 395 and a speaker 390, both of conventional design. Furthermore, the MS 110 includes a radio part 385 for receiving and transmitting USSD operations (including the USSD operation 225), a USSD software (or, e.g., a firmware, hardware, or some combination thereof) application 380 for receiving the subscriber data for MS 295, and a subscriber data storage unit 375.

The MS 110 receives the USSD operation 225 at the radio part 385 and determines/recognizes via a service code in the USSD string that the USSD operation 225 contains at least some subscriber data for MS 295. The USSD operation 225 is then forwarded (along operation arrow 305) to the USSD software application 380 that handles reception of the subscriber data for MS 295. The USSD software application 380 determines/recognizes that the (new) subscriber data for MS 295 is to be stored in the MS 110, so the received subscriber data for MS 295 is stored (via operation arrow 310) in the subscriber data storage 375. Other applications (not shown) and services can subsequently use the stored subscriber data for MS 295. It should be noted that the subscriber data storage 375 may, for example, be either a specialized/reserved memory of the MS 110 or a part of a general-purpose memory of the MS 110.

The present invention is not limited to using the USSD provisions of the GSM standard. Other protocols may be used for sending the subscriber data for MS 295 to the MS 110. Examples of other protocols include, e.g., the Wireless Application Protocol (WAP), which specifies an application framework and network protocols for wireless devices such as MSs, pagers, and Personal Digital Assistants (PDAs); the Short Message Service (SMS) protocol; a specially-specified protocol; etc. If the MS 110 successfully receives and processes (e.g., stores for later use) the subscriber data for MS 295, then a positive response is sent to the MSC/VLR 125 via a USSD operation, for example, and the positive response may then be forwarded to the HLR 105 from the MSC/VLR 125 via the result response of the MAP ISD operation 215. The HLR 105 thus knows that the MS 110 has received the appropriate portion of the SDR 115, and the HLR 105 may unset the flag 280. (If opposite rules are used, then the flag 280 is set at this point in the process, and the HLR 105 originally forwards the subscriber data for MS 295 when the flag 280 is not set because an unset flag 280 indicates that the subscriber data for MS 295 has been altered under an opposite rules paradigm. Generally, a marked flag represents that the subscriber data for MS 295 has been altered, regardless of paradigm. Furthermore, positive or negative logic may be implemented in a given wireless network element.)

When (all or a part of) the subscriber data for MS 295 is removed from the HLR 105 (e.g., in response to an operator command), a MAP DSD operation (not shown) is initiated from the HLR 105 and sent toward the MSC/VLR 125. In turn, the MSC/VLR 125 issues a USSD operation towards the MS 110. The string of this USSD operation contains information/instruction(s) (e.g., a code) that causes the USSD application 380 to remove the corresponding data from the subscriber data storage 375. If the MS 110 is unavailable, a DSD-pending flag (not shown) for the subscriber data for MS 295 is set. Subsequently, when the MS 110 updates its location, the MAP DSD operation will be retransmitted to the MSC/VLR 125 (along with a MAP ISD operation for the location updating).

With reference now to FIG. 4, a method in flowchart form in accordance with the present invention is illustrated. Flowchart 400 shows exemplary steps associated with manipulating an SDR. Initially, and by way of example, an MS enters a new LA and thus sends a location updating request to the corresponding VN (step 405). The VN sends a MAP UPDATE operation to the SRN associated with the MS (and the current user/subscriber of the MS) (step 410). The SRN inspects the flag of the SDR that is associated with the subscriber data (SD) for the MS (step 415), as explained above with reference to FIG. 2.

If the flag is set (and therefore indicates that the SD of the MS has been altered since it was last sent to the MS) (as determined in step 420), then the SRN initiates a MAP ISD operation towards the VN with the full SDR, in this example. The full SDR includes the SD for the VN and the SD for the MS (step 430). Alternatively, only parts (e.g., those corresponding to multiple set flags) of the SD for the MS may be sent, as explained above with reference to FIG. 2. The VN receives the SDR and determines/recognizes that SD for the MS is included (step 435). This recognition may arise, for example, from analyzing the differing content of the SDR alone, from an alphanumeric code in the SDR, from indicia provided in a MAP message, etc.

The VN forwards the SD for the MS to the MS that originally made the location update request (step 440). As explained above with reference to FIG. 2, the USSD protocol may be used to forward the SD for the MS. An application in the MS receives and processes (e.g., stores for subsequent use) the SD for the MS (step 445), as explained above with reference to FIG. 3. If either the single flag is not set or no flag of multiple flags is set, depending on the implementation, (as determined at step 420), then the SRN initiates a MAP ISD operation towards the VN with only part of the SDR, namely the part of the SDR that corresponds to the SD for the VN (step 425). It should also be noted that the SD for the MS (with or without the SD for the VN) may be forwarded to the VN and then to the MS (according to steps 430–445) at times when the SD for the MS is altered by the operator or at the request of the subscriber (step 450).

Application of the principles of the present invention therefore enables a myriad of new options for manipulating SDR information. Such new options advantageously provide new avenues to respond to the greater and more-intelligent services being implemented in MSs. The ability of the MS to handle at least a portion of the SDR information, especially in situations in which the information is controlled by the network, drastically increases and/or improves convenience features provided to the operator of the wireless network system by the wireless network system equipment.

Although preferred embodiment(s) of the method and system of the present invention have been illustrated in the accompanying Drawings and described in the foregoing Detailed Description, it will be understood that the present invention is not limited to the embodiment(s) disclosed, but is capable of numerous rearrangements, modifications, and substitutions without departing from the spirit and scope of the present invention as set forth and defined by the following claims.

What is claimed is:

1. A method for manipulating subscriber data in a wireless network system having a mobile station, comprising the steps of:

determining, responsive to a location update, that subscriber data for said mobile station may be updated, said subscriber data comprising information pertaining to a subscriber of said mobile station;

sending said subscriber data for said mobile station from a first node to a second node based on said step of determining; and sending said subscriber data for said mobile station from said second node to said mobile station.

2. The method according to claim 1, wherein said step of determining, responsive to a location update, that subscriber data for said mobile station may be updated further comprises the step of inspecting at least one flag associated with said subscriber data for said mobile station.

3. The method according to claim 2, wherein said step of sending said subscriber data for said mobile station from a first node to a second node based on said step of determining further comprises the step of sending said subscriber data for said mobile station when said at least one flag is marked.

4. The method according to claim 2, further comprising the step of marking said at least one flag when said subscriber data for said mobile station is altered.

5. The method according to claim 1, wherein said subscriber data for said mobile station comprises Internet service subscription information.

6. The method according to claim 5, wherein said Internet service subscription information comprises a password and an Internet protocol address.

7. The method according to claim 1, further comprising the step of, prior to said step of sending said subscriber data for said mobile station from said second node to said mobile station, determining that said subscriber data for said mobile station has been received.

8. A method for manipulating subscriber data in a wireless network system having a mobile station, comprising the steps of:

determining that subscriber data for said mobile station may be updated;

sending said subscriber data for said mobile station from a first node to a second node based on said step of determining;

determining that said subscriber data for said mobile station has been received;

after said step of determining that said subscriber data for said mobile station has been received, sending said subscriber data for said mobile station from said second node to said mobile station; and wherein said step of determining that said subscriber data for said mobile station has been received further comprises the step of analyzing at least one of (i) a content of a received subscriber data record, (ii) an alphanumeric code of said received subscriber data record, and (iii) an indication provided in said step of sending said subscriber data for said mobile station from a first node to a second node based on said step of determining.

9. The method according to claim 1, further comprising the steps of:

receiving said subscriber data for said mobile station at said mobile station; and storing said subscriber data for said mobile station at said mobile station.

10. The method according to claim 9, further comprising the steps of:

accessing said subscriber data for said mobile station that is stored in said mobile station during said step of storing; and providing a service to a subscriber using said subscriber data for said mobile station that is accessed during said step of accessing.

11. The method according to claim 1, wherein said step of sending said subscriber data for said mobile station from a first node to a second node based on said step of determining further comprises the step of sending said subscriber data for said mobile station using a Mobile Application Part operation.

12. The method according to claim 1, wherein said step of sending said subscriber data for said mobile station from said second node to said mobile station further comprises the step of sending said subscriber data for said mobile station using an Unstructured Supplementary Service Data operation.

13. The method according to claim 1, further comprising the steps of:

sending an operation to said mobile station to delete at least part of said subscriber data for said mobile station; and deleting at least part of said subscriber data for said mobile station from a memory of said mobile station.

14. The method according to claim 1, wherein said first node comprises a subscription record node and said second node comprises a visiting node.

15. A wireless network system in which subscriber data may be manipulated, comprising:

a first node having subscriber data for a mobile station, said subscriber data comprising information pertaining to a subscriber of said mobile station, said first node capable of determining, responsive to a location update, whether said subscriber data for said mobile station should be updated;

a second node in communication with said first node, said second node adapted to receive said subscriber data for said mobile station from said first node and to transmit said subscriber data for said mobile station to said mobile station; and said mobile station having an application configured to receive said subscriber data for said mobile station from said second node.

16. The wireless network system of claim 15, wherein said first node includes at least one flag associated with said subscriber data for said mobile station, and said first node inspects said at least one flag when determining, responsive to a location update, whether said subscriber data for said mobile station should be updated.

17. The wireless network system of claim 16, wherein said first node transmits said subscriber data for said mobile station to said second node responsive to said location update and when said at least one flag is marked.

18. The wireless network system of claim 16, wherein said first node marks said at least one flag when said subscriber data for said mobile station is altered.

19. The wireless network system of claim 15, wherein said subscriber data for said mobile station comprises Internet service subscription information.

20. The wireless network system of claim 19, wherein said Internet service subscription information comprises a password and an Internet protocol address.

21. The wireless network system of claim 15, wherein said second node determines that said subscriber data for said mobile station has been received prior to transmission of said subscriber data for said mobile station to said mobile station.

22. A wireless network system in which subscriber data may be manipulated, comprising:

a first node having subscriber data for a mobile station, said first node capable of determining whether said subscriber data for said mobile station should be updated;

a second node in communication with said first node, said second node adapted to receive said subscriber data for said mobile station from said first node and to transmit said subscriber data for said mobile station to said mobile station, said second node further adapted to determine that said subscriber data for said mobile station has been received prior to transmission of said subscriber data for said mobile station to said mobile station;

said mobile station having an application configured to receive said subscriber data for said mobile station from said second node; and wherein said second node determines that said subscriber data for said mobile station has been received based, at least in part, on an analysis of at least one of (i) a content of a received subscriber data record, (ii) an alphanumeric code of said received subscriber data record, and (iii) an indication provided when said subscriber data for said mobile station is received from said first node.

23. The wireless network system of claim 15, wherein said mobile station receives said subscriber data for said mobile station from said second node and said application stores said subscriber data for said mobile station at said mobile station.

24. The wireless network system of claim 23, wherein said application accesses said subscriber data for said mobile station that is stored at said mobile station and said mobile station provides a service to a subscriber using said subscriber data for said mobile station that is accessed by said application.

25. The wireless network system of claim 15, wherein said second node receives said subscriber data for said mobile station from said first node via a Mobile Application Part operation.

26. The wireless network system of claim 15, wherein said mobile station receives said subscriber data for said mobile station from said second node via an Unstructured Supplementary Service Data operation.

27. The wireless network system of claim 15, wherein said mobile station receives an operation to delete at least part of said subscriber data for said mobile station and said application deletes at least part of said subscriber data for said mobile station from a memory of said mobile station.

28. The wireless network system of claim 15, wherein said first node comprises a subscription record node and said second node comprises a visiting node.

29. A wireless network system that manipulates subscriber data for a mobile station, comprising:
a first node having a subscriber data record, said subscriber data record comprising information pertaining to a subscriber of a mobile station;
a second node in communication with said first node; and
wherein said subscriber data record includes first subscriber data for said second node and second subscriber data for said mobile station and to be sent to said mobile station; and
wherein said first node further includes a plurality of flags associated with said second subscriber data for said mobile station, each individual one of said plurality of flags associated with said second subscriber data for said mobile station corresponding to an individual part of said second subscriber data for said mobile station.

30. The wireless network system of claim 29, wherein said first node further includes at least one pointer flag, said at least one pointer flag referencing at least one part of said subscriber data for said mobile station, said at least one part that is referenced capable of varying as different parts of said subscriber data for said mobile station are altered.

31. The wireless network system of claim 29, wherein said first node further includes at least one flag connoting whether a delete subscriber data operation is pending.

32. The wireless network system of claim 29, wherein:
said first node further includes at least one flag
of said plurality of flags that indicates that said subscriber data for said mobile station should be sent to said second node if said at least one flag is marked.

33. The wireless network system of claim 29, wherein:
said each individual one of said plurality of flags indicates that the corresponding individual part of said subscriber data for said mobile station should be sent to said second node if the corresponding individual one is marked.

34. A method for manipulating subscriber data in a wireless network system that includes a mobile station, comprising the steps of:
transmitting a location update message from a node of said wireless network system;
receiving, at said node, subscriber data for said mobile station responsive to said location update message that was transmitted in said step of transmitting a location update message, said subscriber data comprising information pertaining to a subscriber of said mobile station;
recognizing that said subscriber data for said mobile station has been received at said node; and
transmitting said subscriber data for said mobile station from said node to said mobile station using a predetermined protocol.

35. The method according to claim 34, wherein said predetermined protocol comprises at least one of an Unstructured Supplementary Service Data protocol, a Wireless Application protocol, and a protocol designed substantially especially to transmit said subscriber data for said mobile station.

36. A wireless network system that manipulates subscriber data, comprising:
a mobile station, said mobile station including an application for receiving subscriber data for said mobile station and a memory for storing said subscriber data for said mobile station, said subscriber data comprising information pertaining to a subscriber of said mobile station;
said mobile station being capable of transmitting an update location message; and
a visiting node of said wireless network system, said visiting node transmitting said subscriber data for said mobile station to said mobile station responsive to said update location message.

37. The wireless network system of claim 36, wherein said application replaces all or part of old subscriber data for said mobile station that is in said memory with new subscriber data for said mobile station that is received from said visiting node.

38. The wireless network system of claim 36, wherein said application accesses said subscriber data for said mobile station from said memory in order for said mobile station to provide a service to a subscriber based on said subscriber data for said mobile station.

39. A method for manipulating subscriber data in a wireless network system having a mobile station, comprising the steps of:
transmitting a location updating request from said mobile station, said location updating request reaching a first node;
sending an update message from said first node responsive to said location updating request, said update message reaching a second node;
inspecting, responsive to said update message, at least one indicator associated with subscriber data for said mobile station;
determining, based on said step of inspecting, whether said at least one indicator indicates that said subscriber data for said mobile station has been modified;
if not, sending subscriber data for said first node from said second node, said subscriber data for said first node reaching said first node; and
if so,
sending said subscriber data for said first node and said subscriber data for said mobile station from said second node, said subscriber data for said first node and said subscriber data for said mobile station reaching said first node; and
sending said subscriber data for said mobile station from said first node, said subscriber data for said mobile station reaching said mobile station.

40. The method according to claim 39, wherein said at least one indicator comprises at least one flag.

* * * * *

UNITED STATES PATENT AND TRADEMARK OFFICE
CERTIFICATE OF CORRECTION

PATENT NO. : 6,427,076 B2
DATED : July 30, 2002
INVENTOR(S) : Skog

It is certified that error appears in the above-identified patent and that said Letters Patent is hereby corrected as shown below:

Title page,
Item [56], FOREIGN PATENT DOCUMENTS, add:

-- EP    EP 0 836 340    4/1998
   EP    EP 0 562 890    9/1993
   WO    WO 97/29206    5/1997 --

Signed and Sealed this

Twenty-fifth Day of February, 2003

JAMES E. ROGAN
*Director of the United States Patent and Trademark Office*